Figure 1:
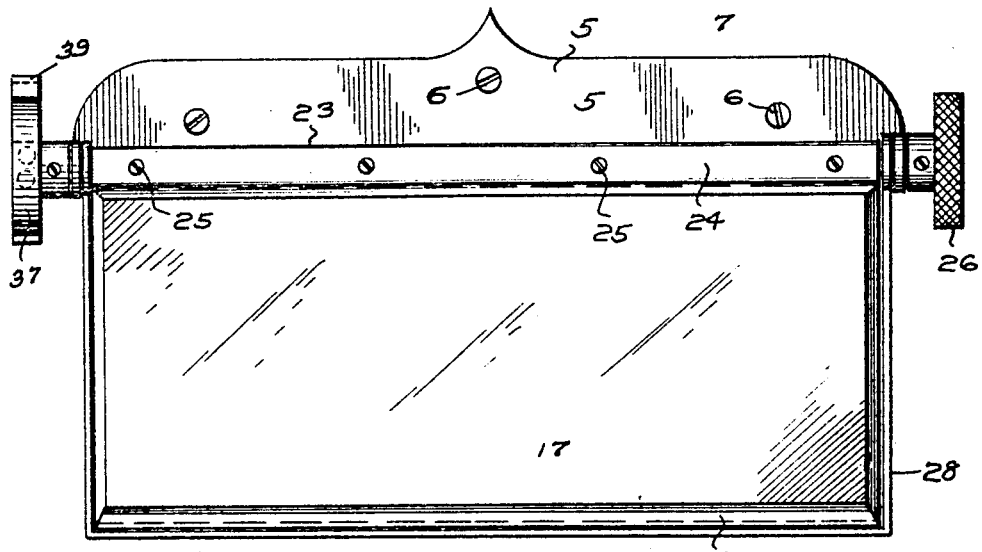

May 17, 1932. J. FOTAKIS 1,858,734
COMBINATION REAR VIEW MIRROR SET FOR AUTOMOBILES
Filed Sept. 8, 1930  2 Sheets-Sheet 1

INVENTOR.
JOHN FOTAKIS,
BY Shepherd & Campbell
ATTORNEY.

May 17, 1932. J. FOTAKIS 1,858,734
COMBINATION REAR VIEW MIRROR SET FOR AUTOMOBILES
Filed Sept. 8, 1930 2 Sheets-Sheet 2
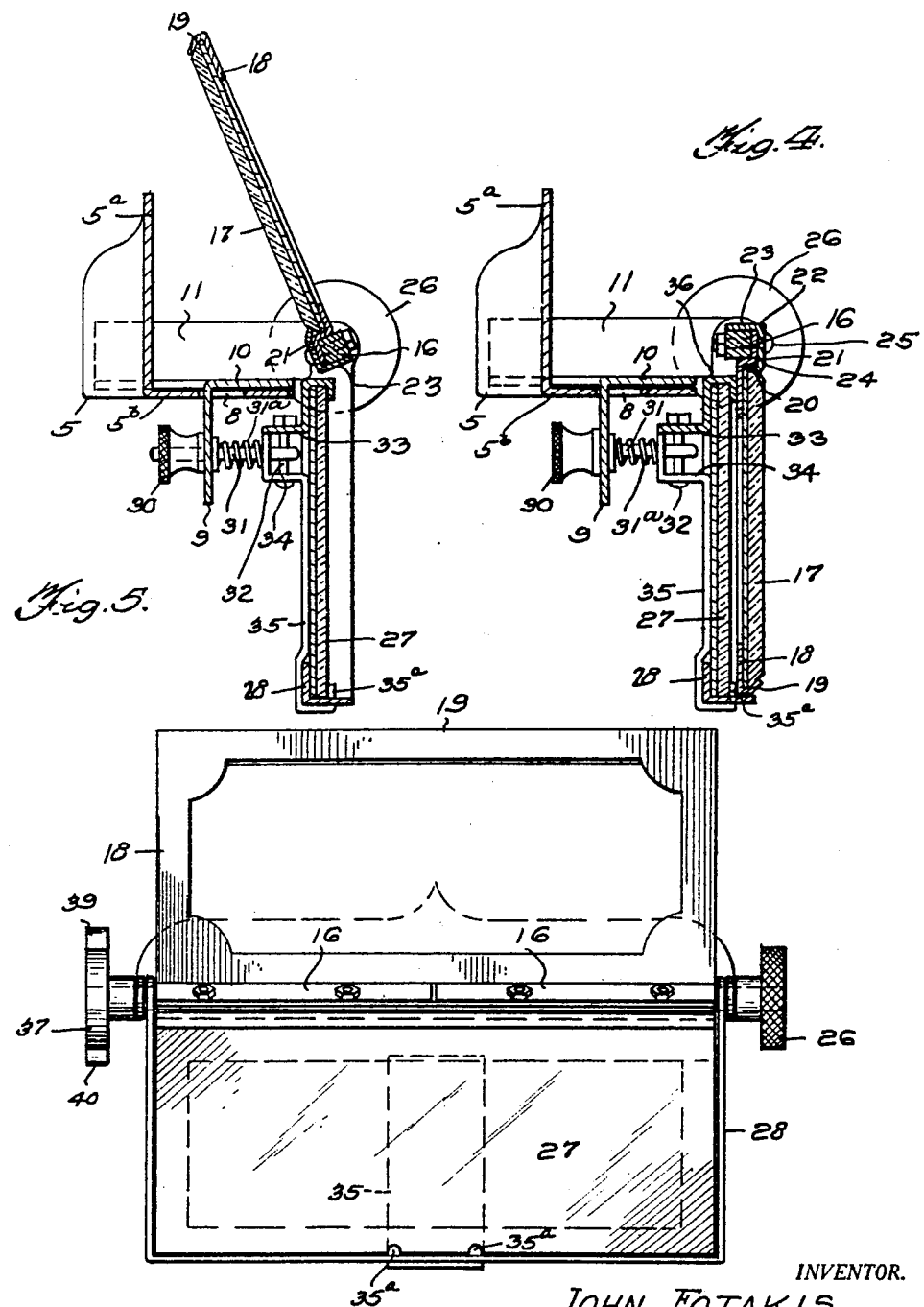
INVENTOR.
JOHN FOTAKIS,
ATTORNEYS Patented May 17, 1932

1,858,734

UNITED STATES PATENT OFFICE

JOHN FOTAKIS, OF DETROIT, MICHIGAN

COMBINATION REAR-VIEW MIRROR SET FOR AUTOMOBILES

Application filed September 8, 1930. Serial No. 480,573.

This invention relates to a combination rear-view mirror set for automobiles, somewhat of the nature of that shown in my Patent No. 1,771,251, of July 22nd, 1930, and my co-pending application, Serial Number 440,851, filed April 1st, 1930.

An object of the present invention is to secure all of the advantages of the structures of my patent and application, aforesaid, while bringing about increased ease of assembly, economy of construction, facility of adjustment of the mirrors, in use, and prevention of objectionable rattling or noise, under the motion of the vehicle.

A further object of the invention is to so construct the device that substitution of a new mirror for a broken mirror may be easily and quickly effected, when necessary.

The rear-view mirrors first employed on automobiles comprised mirrors of ordinary construction, i. e., those having highly reflective backings. While such mirrors were very efficient in daylight driving, they were objectionable for night driving, because they reflected into the eyes of the driver, with full force, the rays from the headlights of following automobiles. To cure the foregoing defect, rear-view mirrors have recently been proposed, and are now largely used, having backings of a dark or black material. These latter mirrors are found to very materially cut down the glare from the headlights of following automobiles, while they still yield a fair service as reflecting mediums, in daylight. However, they are no where near as efficient as rear-vision mirrors as the mirrors having the highly reflective backings.

It is the purpose of the present invention to provide a structure having the advantages of the highly reflective mirrors for daylight driving, and the advantages of the so-called "dark" mirrors for night driving.

Like my application, Serial Number 440,851, the device of the present invention is so constructed that in swinging the day mirror upward, to bring the night mirror into use, the driver need not exercise great care in moving the mirror, but, upon the contrary, can, without taking his eyes from the road, move the movable mirror, in this case the day mirror, in such manner as to uncover the night mirror and bring the rear window of the automobile, and, consequently, the road behind, within his range of vision, as viewed in the mirror.

Further objects and advantages of the invention will be set forth in the detailed description which follows.

Figure 2:
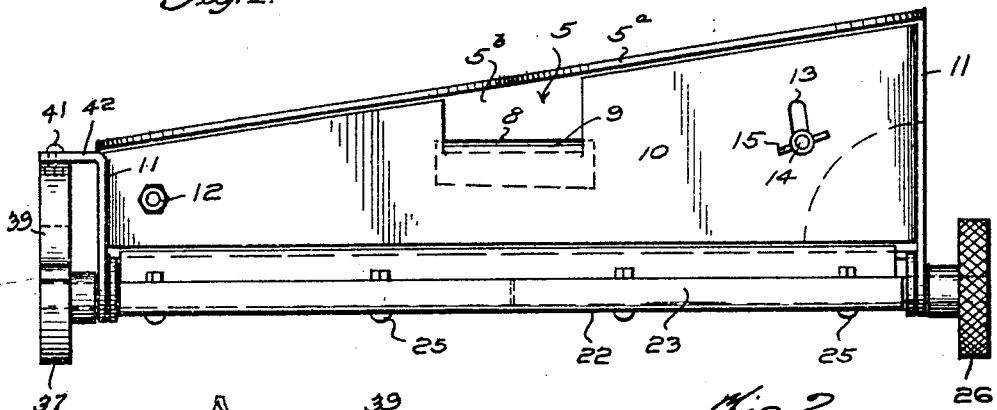
Figure 3:
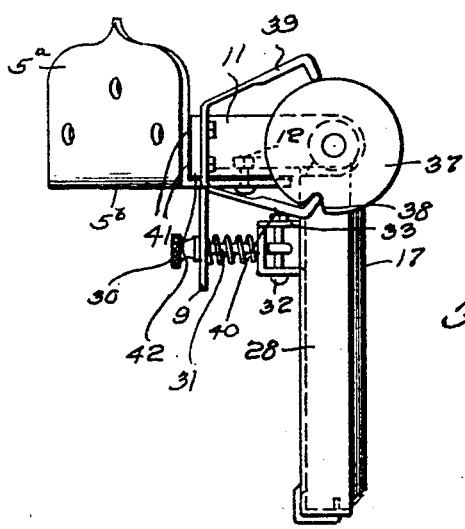

In the accompanying drawings:

Fig. 1 is a front elevation,
Fig. 2 a plan view,
Fig. 3 a left hand end elevation, and
Fig. 4 a transverse vertical section of the device of the present invention,
Fig. 5 is a central transverse vertical section, with the movable mirror in raised position.
Fig. 6 is a front elevation with the day mirror in raised position.

Like numerals designate corresponding parts in all of the figures of the drawings.

Referring to the drawings, 5 designates a tapering bracket that is L-shaped in cross section, and the vertical flange 5ª of which is adapted to be secured by screws, or like fastening devices 6, to the upper portion of the windshield frame 7, of an automobile. The horizontal member 5ᵇ of the L-shaped fixed bracket is provided with an opening 8, through which a downturned ear 9, of a longitudinally tapering plate 10, projects. The plate 10 carries upstanding end portions 11, and said plate is adjustable with respect to the bracket 5, to vary the angularity of the mirrors, hereinafter described, with respect to the bracket 5, and, consequently, with respect to the body of the automobile, as a whole. To effect this adjustment, the plate 10 is pivoted to the portion 5ᵇ, of bracket 5, by a screw, or other pivot 12, adjacent its left hand end, and it is provided with an arcuate slot 13, adjacent its other end, through which a thumb screw 14 passes, said thumb screw being carried by the portion 5ᵇ of bracket 5. A thumb nut 15 serves to tighten the parts in their adjusted position. The end walls 11, of the plate 10, project forwardly beyond said plate far enough to constitute bearings for a pair of rod sections 16, by which the movable and, in this case, the day mirror 17, is carried. This day mirror is mounted in a frame 18, having a rounded lower edge 19, said frame being offset, as indicated at 20, and being provided with a portion 21 which lies flat against the outer faces of the bars 16. A plate 22, having a portion 23, overlying the upper faces of the bars 16, and a vertical portion 24 which extends downwardly to and tightly engages the mirror 17, is traversed by screws 25, said screws passing through the bars 16 and binding the whole assembly tightly together in such manner that when a turning movement is imparted to the bars by a thumb piece 26, the day mirror 17 may be rocked upwardly to the position illustrated in Fig. 5, to uncover the night mirror 27, which is supported in a frame 28, the latter being suspended from the circular end portions, or bearing portions, of the bars 16 in such manner that its vertical inclination may be adjusted by manipulation of a screw 30, which is threaded upon a rod 31, that passes through the ear 9. The inner end of this rod encircles a bolt 32, which passes through a rearward extension 33, of the frame 28, and through a horizontal portion 34, of a strip 35, which extends downwardly along the back of the night mirror, then forwardly beneath the frame 28, and terminates in a pair of spaced teeth 35ª, which project through the bottom of the frame 28, and lie in front of the night mirror 27, and bind the lower portion of the said mirror, tightly in place. The tightening of the screw 32 draws the extension 33 downwardly to cause the otherwise free upper end 36, of the night mirror frame, to be pressed firmly down upon the night mirror, and bind it firmly in place, in its frame 28.

The left hand rod section 16 carries a notched disc 37, having a notch 38 formed therein, which, when the day mirror is in raised position, is engaged by a spring arm 39, and when the day mirror is in its lowered position, is engaged by spring arm 40. These spring arms may be formed from a single piece of steel, and may be supported by screws 41, from an extension 42, of the left hand end wall 11, of plate 10. When the day mirror is in its lowered position, the rounded lower edge 19 of its frame 18 is received snugly within the frame 28, of the night mirror, and, at this time, the teeth 35ª prevent the day mirror from directly contacting with the night mirror, but, upon the contrary, hold the two in slightly spaced relation, so that there will be no danger of the night mirror being broken under the vibration of the day mirror frame.

It will be noted that, while the night mirror is mounted loosely enough to be capable of adjustment to vary its vertical inclination to thereby move the mirror to the position best suited to the eye of the driver, it is held against undesirable rattling by the provision of spring 31ª, which encircles the rod 31, and places the parts under such spring tension as to avoid all vibration or rattling. By making the rod section 16 in two parts, it is possible to very easily assemble the structure by inserting the rounded bearing end portions of said rod sections through the forwardly projecting ears of the end walls 11, of plate 10, and yet these rod sections become, in effect, one continuous bar after they are bound together by the strips 23—24 and screws 25. The day mirror may be supported from the rod sections 16, without the intervention of a supporting frame, and the night mirror may be supported by other means than the frame 28. It is to be understood that the invention includes such changes, as well as any other changes which will accomplish the same general desired result.

From the foregoing description, it will be seen that simple and efficient means are provided for accomplishing the object set forth. It is to be understood that the invention is not limited to the precise construction set forth, but that it includes within its purview whatever changes fairly come within either the terms or the spirit of the appended claims.

Having described my invention, what I claim is:

1. A structure of the character described, comprising a pair of mirror frames and mirrors carried thereby, means for mounting one of said mirrors for bodily swinging movement into and out of covering position with respect to the other of said mirrors, means for effecting a limited angular adjustment of the other of said mirrors while maintaining its relation to the first of said mirrors, and means for maintaining said other mirror under spring tension throughout its positions of adjustment.

2. The combination with a supporting bracket, of a horizontally adjustable plate carried thereby, and a pair of mirror frames pivotally supported from said plate, one of said mirror frames being housed within the other, when in one position of adjustment, means for mounting one of said mirror frames to swing bodily upward to uncover the mirror of the other of said frames, and an adjusting mechanism between an extension of said plate and the last named mirror frame for effecting limited angular adjustment of the same, said adjusting mechanism comprising a spring tensioning means for maintaining the last named mirror frame under spring tension throughout all positions of adjustment.

3. In a device of the character described, a mirror frame, means for pivotally supporting the same, a mirror in said frame, a strip extending along the back of the mirror frame and provided with a portion turned inwardly and upwardly to provide teeth which lie in front of the lower edge of the mirror in said frame, a movable strip engaging over the upper edge of the mirror in the frame, horizontally extending portions carried by the said two strips, drawing means extending through the horizontally extending portions, and an adjusting mechanism engaging said drawing means for tilting the said mirror frame.

4. The combination with a bracket, a plate horizontally adjustable thereon, an ear carried by said plate extending downwardly through an opening in the bracket, a mirror frame, means for pivotally supporting the mirror frame from said plate, separate strips engaging the upper and lower edges of the mirror, and comprising rearwardly extending horizontal portions, a draw bolt extending therethrough, a rod engaging the draw bolt and passing through said ear, and a nut threaded upon said rod.

5. The combination with a bracket, a plate horizontally adjustable thereon, an ear carried by said plate extending downwardly through an opening in the bracket, a mirror frame, means for pivotally supporting the mirror frame from said plate, separate strips engaging the upper and lower edges of the mirror, and comprising rearwardly extending horizontal portions, a draw bolt extending therethrough, a rod engaging the draw bolt and passing through said ear, a nut threaded upon said rod, and a spring encircling said rod and exerting spring tension between the mirror frame and said ear.

6. In a device of the character described, a mirror frame, brackets in which said mirror frame is suspended for rocking movement, said mirror frame including a pair of strips, one of which engages over the upper edge of the glass of the mirror and the other of which engages the lower edge of the glass of the mirror, said strips comprising rearward extensions, one of said extensions having a vertically extending part which bears against the other of said extensions, a draw bolt extending through the horizontal portions of the strip, a rod engaging said draw bolt and passing through said vertical extension, said brackets comprising a horizontally adjustable plate from which the mirror frame is pivotally supported, an ear extending downwardly therefrom through which said rod passes, a thumb nut on the rod, outwardly of said ear, and a spring bearing between said ear and said vertical extension of the strip.

7. A device of the character described, comprising a substantially L-shaped bracket, comprising a vertical portion and a horizontal portion, the horizontal portion being longitudinally tapering and provided with an opening therein, a longitudinally tapering plate pivoted to said horizontal portion of the bracket, adjacent one of its ends, means for adjusting said plate laterally adjacent its other end and for binding it in adjusted position, a downwardly extending ear carried by said plate and projected through the opening of the horizontal portion of the bracket, forwardly projecting ears carried by said plate, a pair of rod sections journaled in said ears, a day mirror frame, means for binding the day mirror frame to the rod sections and for binding the rod sections together, a thumb piece upon one end of the rod sections, a detent disc upon the other end of the rod sections, having a notch formed therein, detent springs engageable with said notch, at the limits of movement of the day mirror frame, a night mirror frame hung from the rod sections upon which the day mirror frame is mounted, said night mirror frame comprising a strip which engages over the upper edge of the night mirror and is provided with a rearward extension, and a second strip which projects upwardly through the bottom of the night mirror frame and terminates in members which lie in front of the lower edge of the night mirror, and between said night mirror and the day mirror frame when the latter is in lowered position, said last named strip comprising a rearward and upward extension, a draw bolt traversing said rearward extensions for drawing them together and binding the night mirror in place, a rod engaging said draw bolt, and extending through the upward extension and through the downward extension of the said plate, a thumb nut threaded upon said rod rearwardly of said downward extension, and a spring encircling said rod between said downward extension and the upward extension of the said strip, as and for the purposes set forth.

8. A structure of the character described comprising a pair of mirror frames and mirrors carried thereby, means for mounting one of said mirrors for bodily swinging movement into and out of covering position, with respect to the other of said mirrors, said means comprising a turnable shaft, a notched disk carried by said shaft and spring means engaging the notch of said disk and adapted to hold the mirror at each of its limits of movement.

9. A structure of the character described comprising a pair of mirror frames and mirrors carried thereby, means for mounting one of said mirrors for bodily swinging movement into and out of covering position, with respect to the other of said mirrors, said means comprising a turnable shaft by which said swinging mirror is carried, a bracket from which said turnable shaft is supported, a notched disk mounted upon an end of said shaft and a pair of spring tongues carried by said bracket, one of said tongues engaging in the notch of the disk at each of the limits of movement of said shaft.

In testimony whereof I affix my signature.
JOHN FOTAKIS.